US009134117B2

(12) United States Patent
Hsu et al.

(10) Patent No.: US 9,134,117 B2
(45) Date of Patent: Sep. 15, 2015

(54) DISTANCE MEASURING SYSTEM AND DISTANCE MEASURING METHOD

(75) Inventors: En Feng Hsu, Taiwan (TW); Hsin Chia Chen, Taiwan (TW)

(73) Assignee: PIXART IMAGING INC., Hsin-Chu (TW)

( * ) Notice: Subject to any disclaimer, the term of this patent is extended or adjusted under 35 U.S.C. 154(b) by 418 days.

(21) Appl. No.: 13/162,829

(22) Filed: Jun. 17, 2011

(65) Prior Publication Data

US 2012/0026319 A1 Feb. 2, 2012

(30) Foreign Application Priority Data

Jul. 27, 2010 (TW) .............................. 099124653 A

(51) Int. Cl.
| H04N 7/18 | (2006.01) |
| G06K 9/00 | (2006.01) |
| G01B 11/30 | (2006.01) |
| G01B 11/25 | (2006.01) |
| G01B 11/22 | (2006.01) |

(52) U.S. Cl.
CPC ............ *G01B 11/2518* (2013.01); *G01B 11/22* (2013.01)

(58) Field of Classification Search
CPC ....... G01B 11/022; H04N 7/18; H04N 7/181; G01C 15/00; G06K 9/00791; G06K 9/00201; G01S 17/89; G06T 2207/10012

USPC .................. 348/135; 356/606; 250/208.1
See application file for complete search history.

(56) References Cited

U.S. PATENT DOCUMENTS

| 6,100,517 A * | 8/2000 | Yahav et al. ................ 250/208.1 |
| 2004/0008259 A1 * | 1/2004 | Gokturk et al. ............ 348/207.1 |
| 2010/0053592 A1 * | 3/2010 | Yahav et al. ................. 356/4.01 |
| 2010/0328682 A1 * | 12/2010 | Kotake et al. ................. 356/620 |
| 2012/0113435 A1 * | 5/2012 | Suzuki et al. ................. 356/612 |
| 2012/0327222 A1 * | 12/2012 | Ng et al. ....................... 348/135 |

FOREIGN PATENT DOCUMENTS

| CN | 101788672 A | 7/2010 |
| TW | 200921248 A | 5/2009 |
| TW | 200921250 A | 5/2009 |
| TW | 200946878 A | 11/2009 |

* cited by examiner

*Primary Examiner* — Dave Czekaj
*Assistant Examiner* — Tsion B Owens
(74) *Attorney, Agent, or Firm* — Lowe Hauptman & Ham, LLP

(57) ABSTRACT

The present invention provides a distance measuring system including a light source, an image sensor and a control and processing unit. The light source projects a light section onto an object with a projection angle. The image sensor senses reflected light from the light section on the object. The control and processing unit controls the light source to project the light section with the projection angle and determines a window of interest of the image sensor according to the projection angle and a predetermined system parameter. The present invention further provides a distance measuring method.

19 Claims, 5 Drawing Sheets

DISTANCE MEASURING SYSTEM AND DISTANCE MEASURING METHOD

CROSS REFERENCE TO RELATED APPLICATION

This application claims the priority benefit of Taiwan Patent Application Serial Number 099124653, filed on Jul. 27, 2010, the full disclosure of which is incorporated herein by reference.

BACKGROUND

1. Field of the Invention

This invention generally relates to a distance measuring system and, more particularly, to an optical distance measuring system and a distance measuring method that have an adjustable window of interest of the image sensor.

2. Description of the Related Art

In recent years, the technology of three-dimensional (3-D) information has been developed rapidly and applied to different fields. In addition to the distance measuring purpose, 3-D range-finding may further be provided to additional applications such as drop tests, observation of a high-speed moving target and automatic controls in robot vision. However, as conventional 3-D range-finding image sensors adopting time-of-flight (TOF) is not able to realize high speed 3-D range finding, several high-speed and high-accuracy 3-D range-finding image sensors using the light-section method have be proposed.

However, in conventional 3-D range-finding methods using the light-section method an image sensor always output sensed image data of the whole sensor array thereof, a window of interest (WOI) of the image sensor can not be changed according to actual detection condition whereby it is difficult to increase the operation efficiency.

Accordingly, a distance measuring system with low power consumption and high frame rate is required by the field.

SUMMARY

The present invention provides a distance measuring system and a distance measuring method that can adjust the window of interest of an image sensor according to the projection angle of a light source thereby reducing the system power consumption and increasing the frame rate.

The present invention further provides a distance measuring system and a distance measuring method that previously stores a relative relation between projection angles of a light source and windows of interest of an image sensor so as to automatically determine the image data to be processed based on the measuring condition thereby reducing the amount of data processing.

The present invention provides a distance measuring method for measuring an object within a predetermined depth range. The distance measuring method includes the steps of: projecting, using a light source, a light section onto the object with a projection angle; sensing, using a plurality of light sensing units, reflected light from the light section on the object; and determining a window of interest of the light sensing units according to the projection angle and the predetermined depth range.

The present invention further provides a distance measuring system for measuring an object within a predetermined depth range. The distance measuring system includes a light source, an image sensor, and a control and processing unit. The light source is configured to project a light section onto the object with a projection angle. The image sensor is configured to sense reflected light from the light section on the object. The control and processing unit is for controlling the light source to project the light section with the projection angle, and for determining a window of interest of the image sensor according to the projection angle and a predetermined system parameter.

The present invention further provides a distance measuring system for generating a 3-D image of a surface. The distance measuring system includes a light source, a plurality of light sensing units, and a control and processing unit. The light source is configured to project a light section onto the surface. The light sensing units are configured to sense reflected light from the surface. The control and processing unit is for controlling the light source to scan the surface with the light section, and for controlling different parts of the light sensing units to output sensed image data according to different projecting positions of the light section and a predetermined system parameter.

According to another embodiment of the present invention, the distance measuring system further includes a light guiding unit configured to guide the reflected light from the light section on the object to the image sensor.

In the distance measuring system and distance measuring method of the present invention, the predetermined system parameter includes a predetermined measurable depth range and a spatial relationship between the light source, the image sensor and the light guiding unit, wherein the spatial relationship and the predetermined measurable depth range may be previously set and stored in the control and processing unit before shipment of the measuring system.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1A:
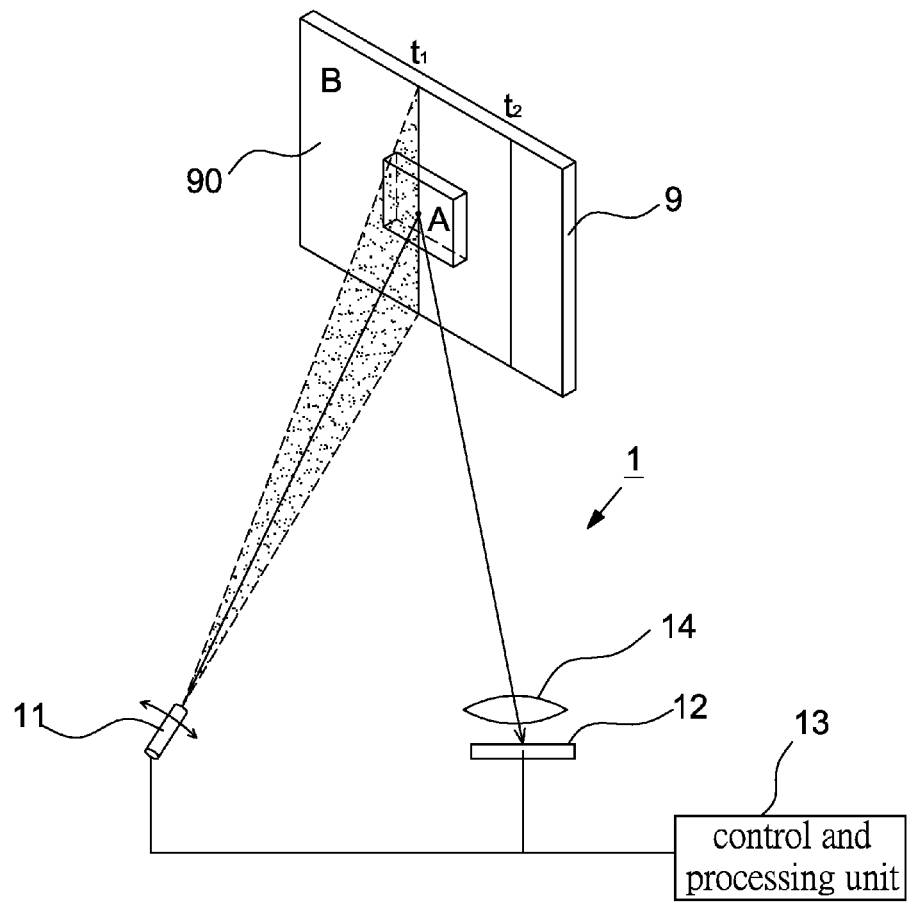
FIG. 1A shows a solid diagram of the distance measuring system according to an embodiment of the present invention.

In the drawings of the present invention, only a part of the components are shown and other components that are not directly pertinent to the present invention are omitted.

Please refer to FIG. 1A, it shows a solid diagram of the distance measuring system according to an embodiment of the present invention. The distance measuring system 1 is configured to measure a three-dimensional (3-D) distance of an object 9 within a predetermined depth range and to generate a 3-D image of a surface 90 of the object 9 facing the distance measuring system 1. For illustration purpose, it is assumed that the surface 90 has, for example, a protrusion part A and a planer region B herein. It should be mentioned that, shapes of the object 9 and the surface 90 that can be measured by the distance measuring system 1 of the present invention are not limited to those shown in FIG. 1A.

The distance measuring system 1 includes a light source 11, an image sensor 12, and a control and processing unit 13. The light source 11 may be, for example, a laser light source, and preferably projects a light section onto the surface 90. In an embodiment, the light source 11 may be a linear laser light source, and the light section projected thereby may be, for example, a line segment having a proper width, wherein a length of the line segment determines a measurable range. The width of the line segment is determined by the characteristics of the light source 11 and does not have any particular limitation. A length direction of the line segment may be along a vertical direction or a horizontal direction. In another embodiment, the light source 11 may also be a point laser light source to project the light section on the surface 90 by scanning thereon. For example, the light source 11 scans from up to down or from down to up to form a line segment on the surface 90 as shown in FIG. 1A.

The image sensor 12 is preferably a CMOS image sensor or a 3-D range-finding image sensor configured to sense reflected light of the light source 11 reflected from the surface 90. The image sensor 12 preferably has a plurality of light sensing units 121 to form a linear sensor array or a sensor matrix of a CMOS chip. Each light sensing unit 121 outputs an electric signal representing image data according to the optical energy sensed thereby.

The control and processing unit 13 is coupled to the light source 11 and the image sensor 12 for controlling the light source 11 to project a light section onto different positions of the surface 90 with different projection angles and to scan the whole or a part of the surface 90 with the light section. For example, when the light source 11 projects the line segment as shown in FIG. 1A, the control and processing unit 13 controls the light source 11 to scan the whole or a part of the surface 90 from left to right or from right to left. In another embodiment, when the light source 11 is a point light source, the control and processing unit 13 first controls the light source 11 to scan from up to down or from down to up to form a line segment, and then to scan other line segments from left to right or from right to left to cover the whole or a part of the surface 90, wherein the scan type and the scanning angle range of the light source 11 may be previously set and stored in the control and processing unit 13. In addition, the distance measuring system 1 may further include a light guiding unit 14 configured to guide the reflected light from the surface 90 to the image sensor 12, and the light guiding unit 14 may be, for example, a lens.

Figure 1B:
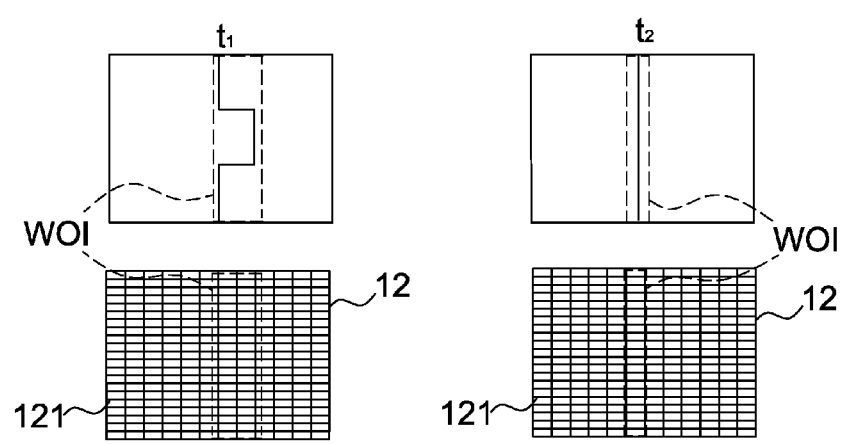
FIG. 1B shows image frames sensed by the image sensor shown in FIG. 1A.

Please refer to FIGS. 1A and 1B together, FIG. 1B shows image frames sensed by the image sensor 12 shown in FIG. 1A, wherein the left diagram is a sensed image frame according to the light section projected by the image source 11 at time $t_1$ and the right diagram is a sensed image frame according to the light section projected by the image source 11 at time $t_2$. The control and processing unit 13 may identify a depth associated with every point of a light section according to a reflected light pattern in the image frame, i.e. identifying a relative distance between every point of the light section and the light source 11. When controlling the light source 11 to accomplish the scanning of the surface 90, the control and processing unit 13 can generate a 3-D image of the surface 90 according to the depth associated with every point.

It is known from FIGS. 1A and 1B, at each projection angle of the light source 11 only a part of the sensor array of the image sensor 12 can sense the reflected light of the light source 11. Therefore, in the present invention the control and processing unit 13 further controls the image sensor 12 to output electric signals of a predetermined window of interest (WOI) of the image sensor 12 according to the projection angle of the light source 11 in conjunction with a predetermined system parameter, and post-processes the electric signals. For example, if the image sensor 12 includes a plurality of light sensing units 121, the control and processing unit 13 controls a part of the light sensing units 121 (e.g. those sensing the reflected light of the light source 11) to output the electric signals, and controls the other light sensing units 121 (e.g. those without sensing the reflected light of the light source 11) not to output the electric signals. In this manner, not only the total power consumption of the distance measuring system 1 can be reduced, the frame rate can also be increased since the image sensor 12 only needs to output a part of the electric signals sensed by its sensor array. In an embodiment, the WOI may be selected to slightly larger than an actual area that senses the reflected light of the light source 11, or the WOI should be at least substantially equal to the actual area that can sense the reflected light of the light source 11.

It is appreciated that, a relative relation between projection angles of the light source 11 and windows of interest of the image sensor 12 may be previously obtained according to the spatial relationship between every component of the distance measuring system 1 by using, for example, triangulation, and previously stored in the control and processing unit 13.

In another embodiment, when the light source 11 projects a horizontal light section onto the surface 90, a length direction of the WOI is along a horizontal direction of the sensor array of the image sensor 12 at different projection angles.

Next, a method that the control and processing unit 13 determines a WOI of the image sensor 12 according to a projection angle of the light source 11 and a predetermined system parameter will be illustrated hereinafter.

Figure 2:
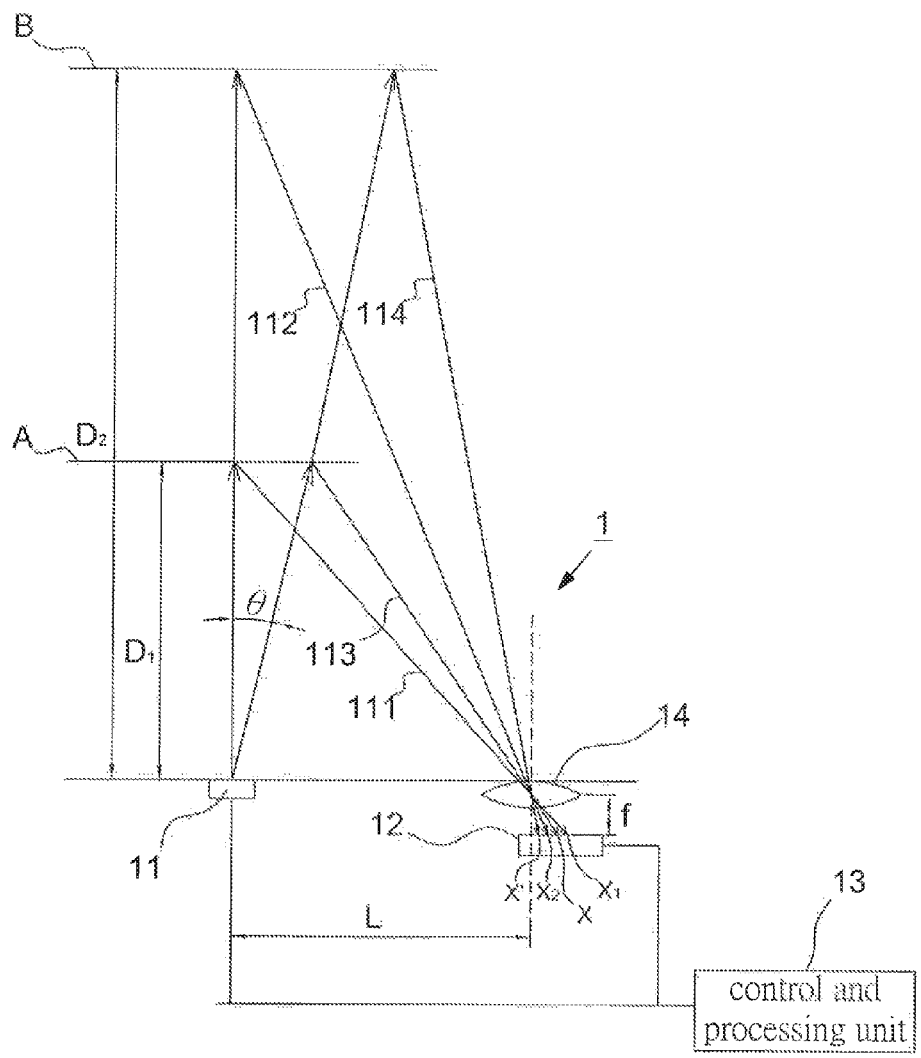
FIG. 2 shows an operational schematic diagram of the distance measuring system according to the embodiment of the present invention.

Please refer to FIG. 2, it shows an operational schematic diagram of the distance measuring system according to the embodiment of the present invention. In FIG. 2, it is assumed that a distance between the protrusion part A and the light source 11 is $D_1$, and a distance between the planer region B and the light source 11 is $D_2$, wherein a range between A and B may be defined as a measurable depth range of the distance measuring system 1 herein, and the depth range may be previously set before shipment of the distance measuring system 1 or be set by a user according to a depth of the object 9. It is also assumed that a transversal distance between a center of the light source 11 and a center of the light guiding unit 14 is L, and the light guiding unit 14 has a focus distance f. When a projection direction of the light source 11 is parallel to a normal line of the surface 90, the light 111 projected on the protrusion part A by the light source 11 will be reflected to a position $X_1$ on the sensor array of the image sensor 12 while the light 112 projected on the planer region B by the light source 11 will be reflected to a position $X_2$ on the sensor array of the image sensor 12. If there is an included angle θ between the projection direction of the light source 11 and the normal line of the surface 90, the light 113 projected on the protrusion part A by the light source 11 will be reflected to a position X on the sensor array of the image sensor 12 while the light 114 projected on the planer region B by the light source 11 will be reflected to a position X' on the sensor array of the image sensor 12.

When the light source 11 projects the light along the normal line of the surface 90 (i.e. θ=0), following equations can be derived according to the triangulation:

$$D_1/L = f/X_1 \quad \text{equation (1)}$$

$$D_2/L = f/X_2 \quad \text{equation (2)}$$

If there is an included angle between the projection direction of the light source 11 and the normal line of the surface 90 (i.e. θ≠0), following equations can further be derived according to the triangulation:

$$D_1 = (f \times L)/(X + f \times \tan\theta) \quad \text{equation (3)}$$

$$D_2 = (f \times L)/(X' + f \times \tan\theta) \quad \text{equation (4)}$$

wherein X is a position on the sensor array of the image sensor 12 on which the light from the protrusion part A reflects when the projection angle of the light source 11 is not zero (i.e. θ≠0); X' is a position on the sensor array of the image sensor 12 on which the light from the planer region B reflects when the projection angle of the light source 11 is not zero (i.e. θ≠0). According to equations (3) and (4), as f, L, $D_1$ and $D_2$ are the relationships between system components and can be obtained previously, when the control and processing unit 13 controls the light source 11 to project the light section with an projection angle θ, the area on the sensor array of the image sensor 12 able to sense the reflected light of the light source 11 is already known, and thus the control and processing unit 13 is able to accordingly determine the WOI of the image sensor 12. In other words, the predetermined system parameter herein includes a predetermined depth range (between A and B) and a spatial relationship between the light source 11, the image sensor 12 and the light guiding unit 14.

Figure 3:
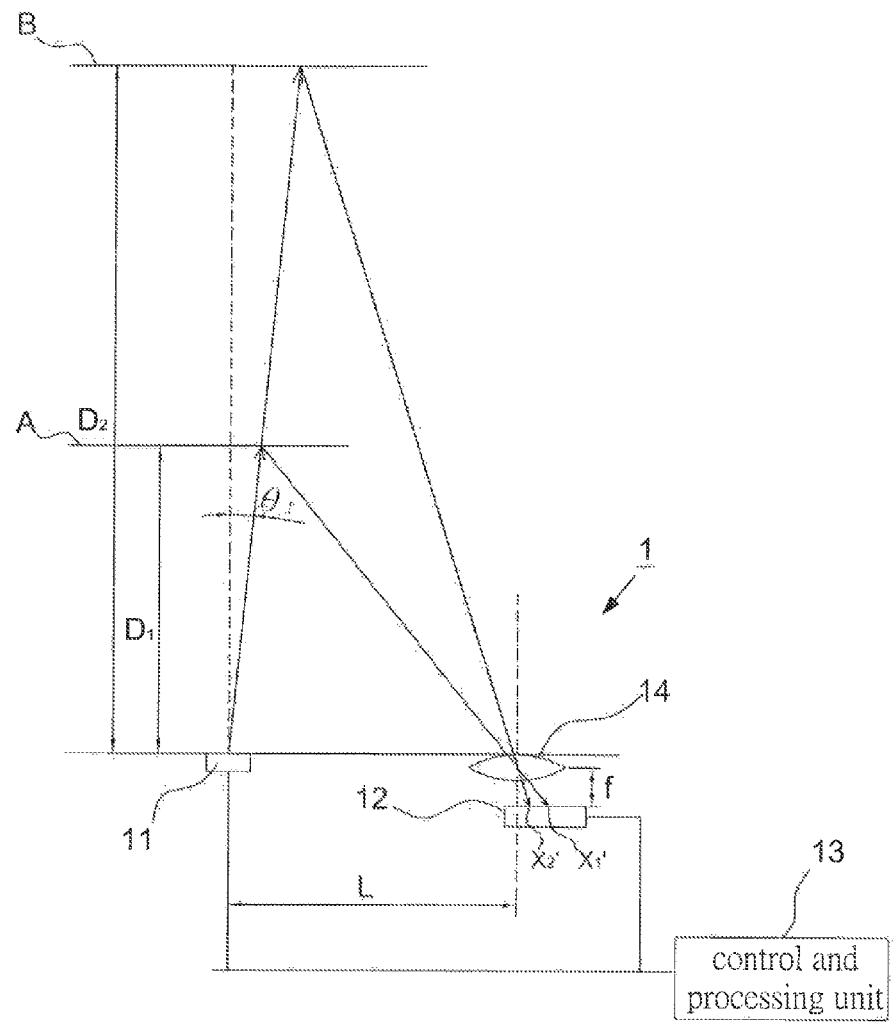
FIG. 3 shows another operational schematic diagram of the distance measuring system according to the embodiment of the present invention, wherein a projection angle of the light source is $\theta_1$.

For example refer to FIG. 3, when the control and processing unit 13 controls the light source 11 to project a light section with a projection angle $\theta_1$ onto the surface 90, the reflected light from the protrusion part A will be reflected to the position $X_1'$ of the image sensor 12 while that from the planer region B will be reflected to the position $X_2'$ of the image sensor 12. The WOI of the image sensor 12 may be selected to be substantially equal to or slightly larger than the region between $X_1'$ and $X_2'$.

Figure 4:
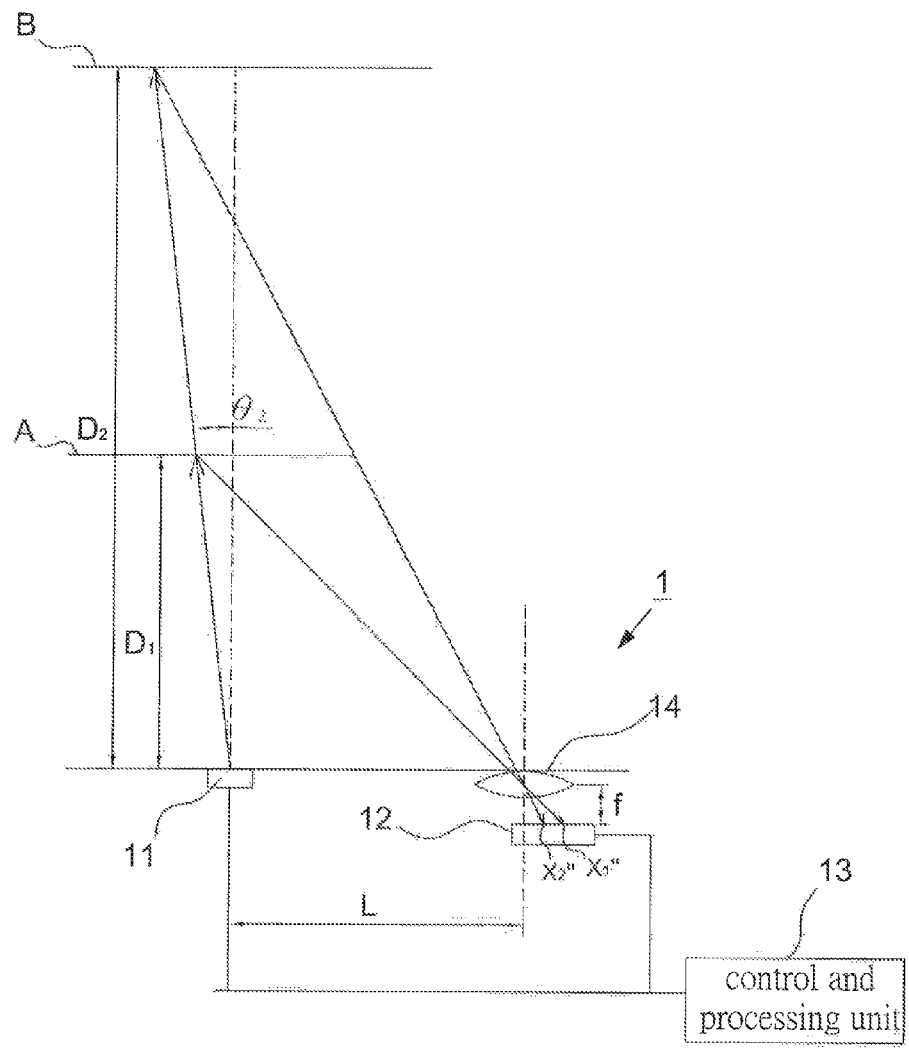
FIG. 4 shows another operational schematic diagram of the distance measuring system according to the embodiment of the present invention, wherein a projection angle of the light source is $\theta_2$.

For example refer to FIG. 4, when the control and processing unit 13 controls the light source 11 to project a light section with a projection angle $\theta_2$ onto the surface 90, the reflected light from the protrusion part A will be reflected to the position $X_1''$ of the image sensor 12 while that from the planer region B will be reflected to the position $X_2''$ of the image sensor 12. The WOI of the image sensor 12 may be selected to be substantially equal to or slightly larger than the region between $X_1''$ and $X_2''$.

It is known from FIGS. 2 to 4, according to a spatial relationship between every system component, each projection angle of the light source 11 corresponds to a WOI of the image sensor 12. When the image sensor includes a linear sensor array, the WOI may be a section of light sensing units 121. When the image sensor includes a sensor matrix, the WOI may be an area of light sensing units 121. In addition it is appreciated that, the size and the spatial relationship shown in FIGS. 2 to 4 are only exemplary rather than limitations to the present invention.

Figure 5:
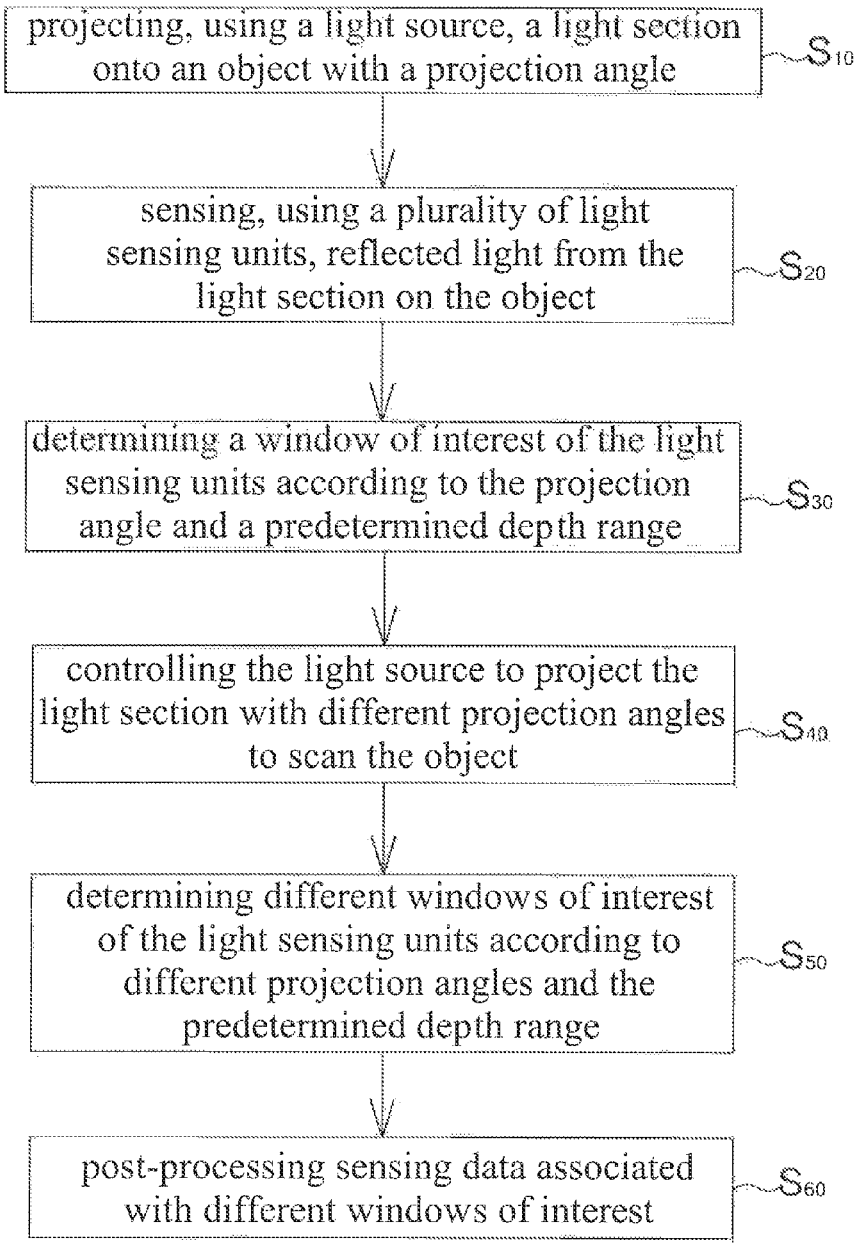
FIG. 5 shows a flow chart of the distance measuring method according to an embodiment of the present invention.

Please refer to FIGS. 2 to 5 together, FIG. 5 shows a flow chart of the distance measuring method according to an embodiment of the present invention including the steps of: projecting, using a light source, a light section onto an object with a projection angle (Step $S_{10}$); sensing, using a plurality of light sensing units, reflected light from the light section on the object (Step $S_{20}$); determining a window of interest of the light sensing units according to the projection angle and a predetermined depth range (Step $S_{30}$); controlling the light source to project the light section with different projection angles to scan the object (Step $S_{40}$); determining different windows of interest of the light sensing units according to the different projection angles and the predetermined depth range (Step $S_{50}$); and post-processing sensing data associated different windows of interest (Step $S_{60}$); wherein the post-processing may be the determination of a depth associated with every point of the light section according to the sensing data of determined window of interest or the generation of a 3-D image of an object according to the sensing data of different windows of interest determined. In addition, details of the distance measuring method of the present invention have been shown in FIGS. 2 to 4 and corresponding illustrations and thus will not be repeated herein.

As mentioned above, as the image sensor in conventional distance measuring systems always output the sensed image data of the whole sensor array during operation, it has a lower operational efficiency. The present invention further provides a distance measuring system and a distance measuring method that can previously construct a relative relation between projection angles of the light source and windows of interest of the image sensor according to a measurable depth range and a spatial relationship between system components. When the light source projects a light section onto an object with different projection angles, the image sensor is controlled to only output the sensed image data of determined window of interest according to the relative relation thereby reducing the total power consumption and increasing the frame rate of the system.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A distance measuring method for measuring an object within a predetermined depth range, the method comprising:
   projecting, using a light source, a light section onto the object with a projection angle which is an angle between a projection direction of the light section and a normal line of a surface of the object facing the light source;
   sensing, using a sensor array comprising a plurality of light sensing units, reflected light from the light section on the object;
   determining the light sensing units that are to sense the reflected light from the light section on the object as a window of interest of the sensor array according to the projection angle and the predetermined depth range;
   controlling the light sensing units of the sensor array within the window of interest to output electric signals, and
   controlling the light sensing units of the sensor array, which are not within the window of interest and do not sense the reflected light from the light section on the object, not to output electric signals.

2. The distance measuring method as claimed in claim 1, wherein the light section is a line segment.

3. The distance measuring method as claimed in claim 1, further comprising:
   post-processing sensing data of the window of interest to identify a depth associated with every point of the light section.

4. The distance measuring method as claimed in claim 1, further comprising:

controlling the light source to project the light section with different projection angles to scan the object; and determining different windows of interest of the light sensing units according to the different projection angles and the predetermined depth range.

5. The distance measuring method as claimed in claim 4, further comprising:

post-processing sensing data of the windows of interest to generate a 3-D image of the object.

6. A distance measuring system for measuring an object within a predetermined depth range, the distance measuring system comprising:

a light source configured to project a light section onto the object with a projection angle which is an angle between a projection direction of the light section and a normal line of a surface of the object facing the light source;

a sensor array comprising a plurality of light sensing units configured to sense reflected light from the light section on the object; and a control and processing unit configured to
control the light source to project the light section with the projection angle,
determine the light sensing units that are to sense the reflected light from the light section on the object as a window of interest of the sensor array according to the projection angle and a predetermined system parameter,
control the light sensing units of the sensor array within the window of interest to output electric signals, and
control the light sensing units of the sensor array, which are not within the window of interest and do not sense the reflected light from the light section on the object, not to output electric signals.

7. The distance measuring system as claimed in claim 6, further comprising a light guiding unit configured to guide the reflected light from the light section on the object to the light sensing units.

8. The distance measuring system as claimed in claim 7, wherein the predetermined system parameter comprises the predetermined depth range and a spatial relationship between the light source, the light sensing units and the light guiding unit.

9. The distance measuring system as claimed in claim 6, wherein the sensor array forms a linear sensor array or a sensor matrix.

10. The distance measuring system as claimed in claim 6, wherein the light section is a line segment.

11. A distance measuring system for generating a 3-D image of a surface, the distance measuring system comprising:

a light source configured to project a light section onto the surface;

a sensor array comprising a plurality of light sensing units configured to sense reflected light from the surface; and a control and processing unit configured to
control the light source to scan the surface with the light section,
control the light sensing units that are to sense the reflected light from the light section on the surface to output sensed image data according to different projecting positions of the light section and a predetermined system parameter, and
control the light sensing units that do not sense the reflected light from the light section on the surface not to output sensed image data,
wherein each of the projecting positions of the light section is determined by an angle between a projection direction of the light section and a normal line of the surface.

12. The distance measuring system as claimed in claim 11, further comprising:

a light guiding unit configured to guide the reflected light from the light section on the surface to the light sensing units.

13. The distance measuring system as claimed in claim 12, wherein the predetermined system parameter comprises a predetermined depth range and a spatial relationship between the light source, the light sensing units and the light guiding unit.

14. The distance measuring system as claimed in claim 12, wherein the light source is a linear laser light source or a point laser light source; and the light guiding unit is a lens.

15. The distance measuring system as claimed in claim 11, wherein the light sensing units form an image sensor array of a CMOS chip.

16. The distance measuring system as claimed in claim 11, wherein the control and processing unit is further configured to generate the 3-D image of the surface according to the sensed image data outputted from the light sensing units.

17. The distance measuring method as claimed in claim 1, wherein the light source is a point light source, and the distance measuring method further comprises:

scanning a segment using the point light source to form the light section.

18. The distance measuring method as claimed in claim 1, wherein the window of interest of the sensor array is at least equal to an actual area that senses the reflected light from the light section on the object.

19. The distance measuring system as claimed in claim 6, wherein the window of interest of the sensor array is at least equal to an actual area that senses the reflected light from the light section on the object.

\* \* \* \* \*